May 14, 1963     O. I. THOMPSON     3,089,255

ANSWER CHECKING DEVICE

Filed March 5, 1962     4 Sheets-Sheet 1

Inventor
Orville I. Thompson
By Stone, Niemann, Burmeister & Zimmer
Attorneys

May 14, 1963 O. I. THOMPSON 3,089,255
ANSWER CHECKING DEVICE
Filed March 5, 1962 4 Sheets-Sheet 2
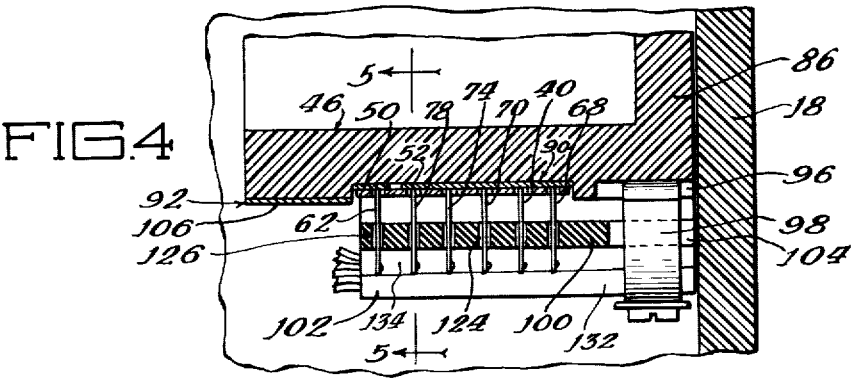
FIG.4
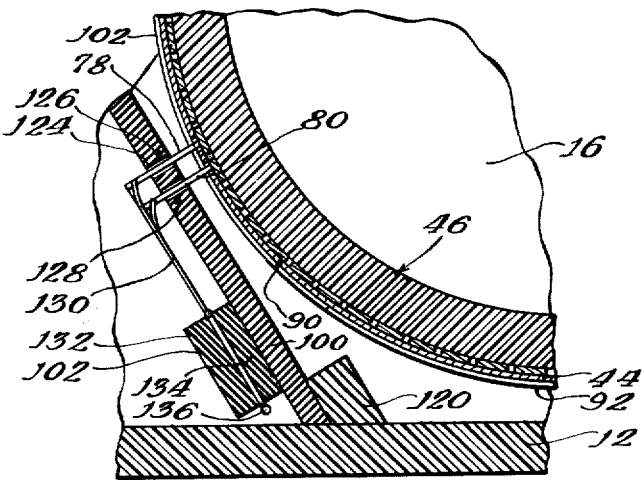
FIG.5
FIG.6
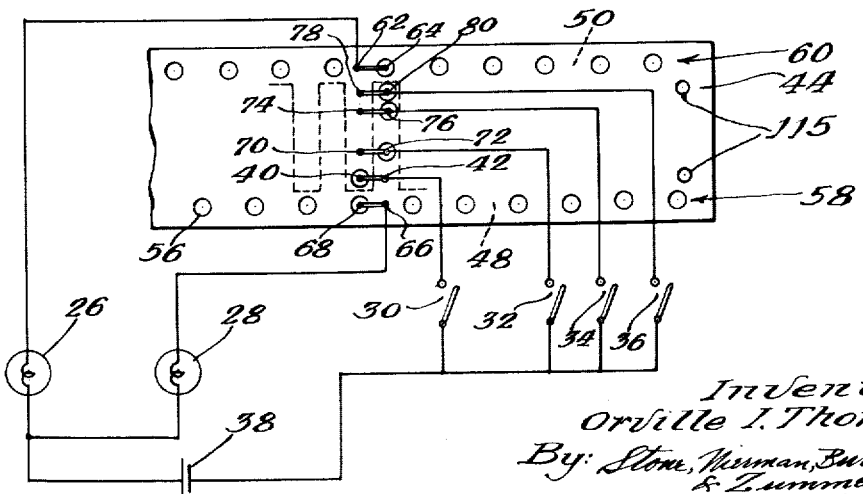
Inventor:
Orville I. Thompson
By: Stone, Neuman, Burmeister,
& Zimmer
Attorneys May 14, 1963  O. I. THOMPSON  3,089,255
ANSWER CHECKING DEVICE
Filed March 5, 1962  4 Sheets-Sheet 3
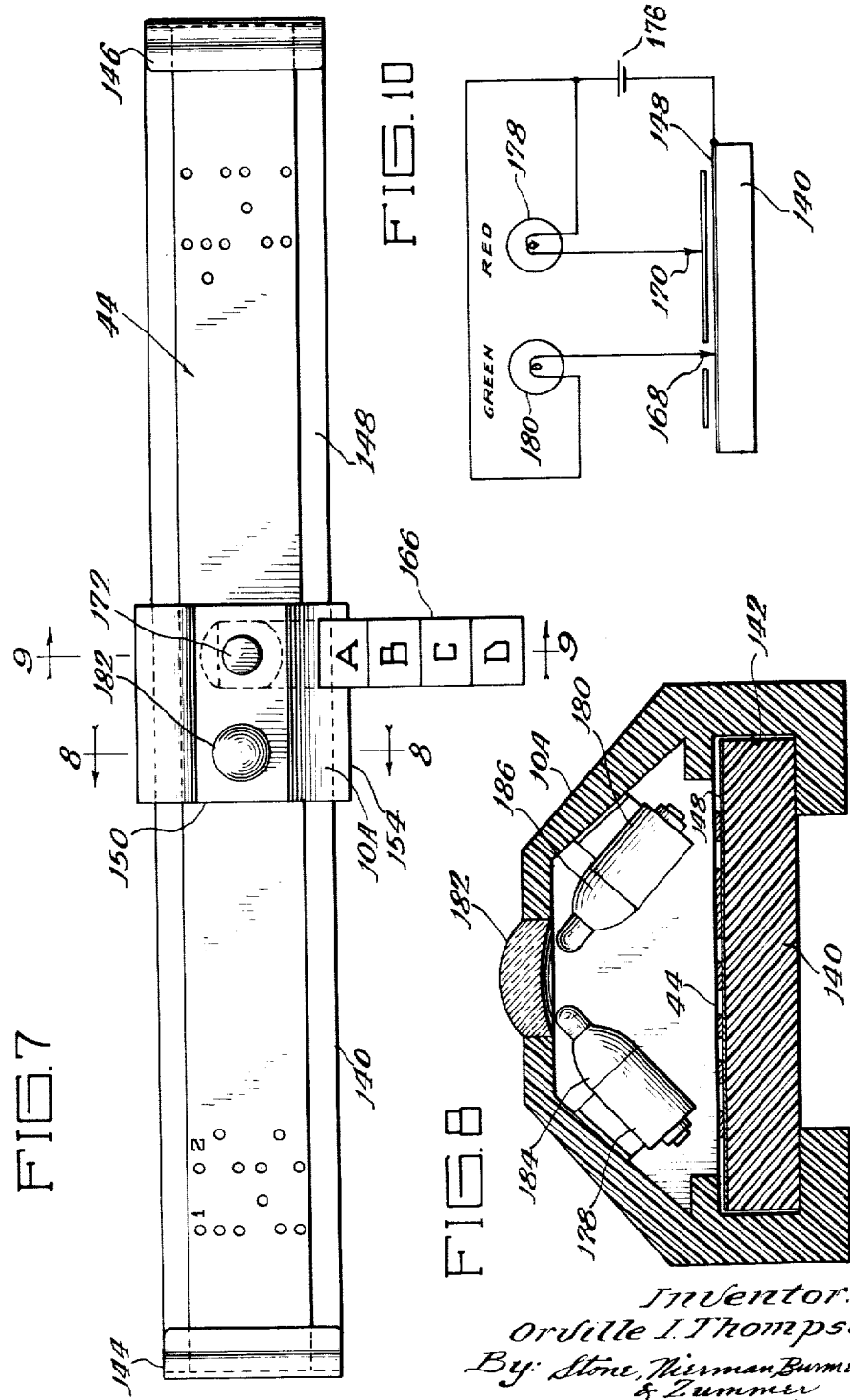
Inventor:
Orville I. Thompson
By: Stone, Nieman, Burmeister
& Zummer
Attorneys May 14, 1963 O. I. THOMPSON 3,089,255
ANSWER CHECKING DEVICE
Filed March 5, 1962 4 Sheets-Sheet 4
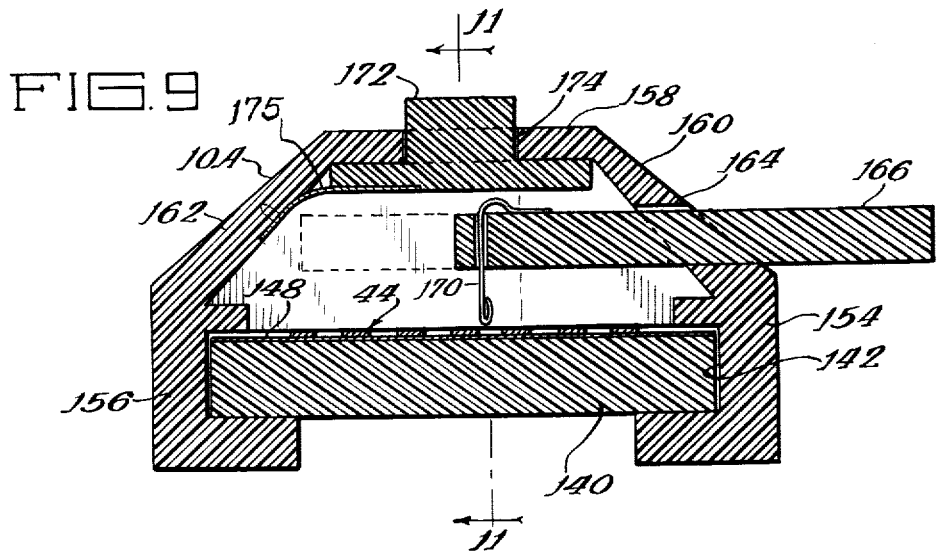
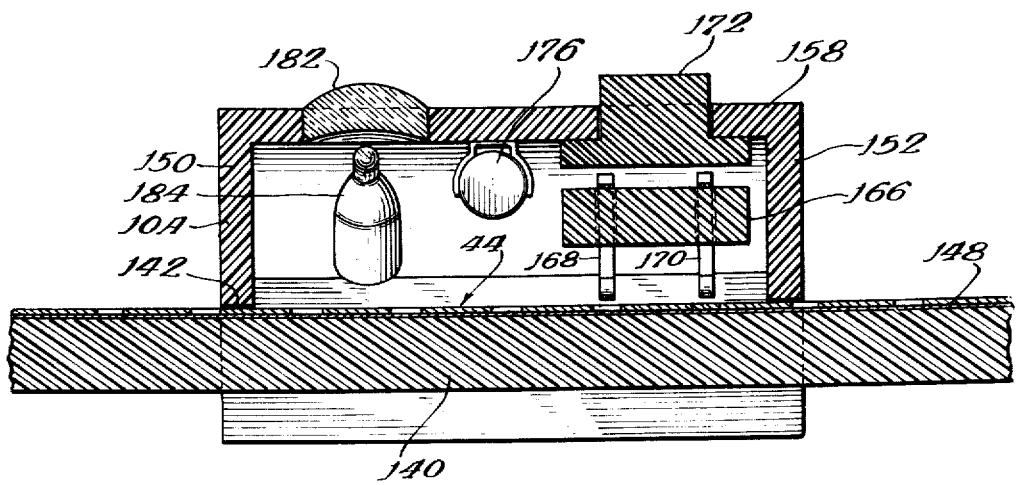
Inventor:
Orville I Thompson
By: Stone, Nieman, Burmeister, & Zummer
Attorneys

United States Patent Office 3,089,255
Patented May 14, 1963

3,089,255
ANSWER CHECKING DEVICE
Orville I. Thompson, Deerfield, Ill., assignor to DeVry
Technical Institute, Inc., Chicago, Ill., a corporation of
Illinois
Filed Mar. 5, 1962, Ser. No. 177,609
15 Claims. (Cl. 35—9)

The present invention relates generally to devices for checking the answers of students, and more particularly to electrical devices for indicating the correctness of one of a plurality of multiple choice answers.

Teaching machines have come into more frequent use in recent years. Generally, such machines are used in laboratories under the supervision of a laboratory instructor. There is, however, a need for a machine to indicate correct answers and incorrect answers which may be operated by the student without supervision. Students who do the major portion of their studying at home can be taught more rapidly in many cases by a question answer technique, and a device to indicate the right and wrong answers at the time the student makes them can be of value to the educational processes.

It is one of the objects of the present invention to provide an answer checking device which may be operated by the student without supervision and which is capable of indicating the correct or incorrect answer to multiple choice questions. It is particularly an object of the present invention to provide such an answer checking device which may be used by home students.

Home students often receive materials by correspondence, and do their entire studying in the confines of their own quarters. Generally, such students receive an instruction book or manual, and such books often contain a plurality of numbered questions. An answer checking device must be keyed or correlated with the numbers of the questions in the instruction manual. Some mechanical or electrical mechanism must be provided to key or correlate the answer checking device with the questions in the manual. It is therefore an object of the present invention to provide an answer checking device with an answer keying mechanism which may be utilized to correlate the answers of the answer checking device with a manual or other type question device.

For home students, it is imperative that the mechanism which keys the answer checking device to an instruction manual be capable of substitution so that different instructions books can be utilized with a single answer checking device. It is a further object of the present invention to provide an answer checking device with an answer keying mechanism which may be readily interchanged and which may be readily transported without requiring transporting of the answer checking device itself.

If the correct answers can readily be determined by observation of the answer keying device, it is apparent that a student need never tax his mental processes to reach the proper answer to a given question. It is therefore an additional object of the present invention to provide an answer checking device in which the mechanism which keys the answer checking device to an instruction book cannot readily be utilized to determine the correct answer in the absence of the other elements of the answer checking device.

Further, an answer checking device suitable for use by home and correspondence students must be inexpensive, fool-proof, and sturdy. These and additional objects and advantages of the present invention will become readily apparent to those skilled in the art from a further examination of this disclosure, particularly when viewed in the light of the drawings, in which;

FIGURE 4 is a fragmentary sectional view taken along the line 4—4 of FIGURE 2;

FIGURE 5 is a fragmentary sectional view taken along the line 5—5 of FIGURE 4;

FIGURE 6 is a schematic electrical circuit diagram of the answer checking device illustrated in FIGURES 1 through 5;

FIGURE 7 is a plan view of an answer checking device which constitutes a further embodiment of the present invention;

FIGURE 8 is a sectional view taken along the line 8—8 of FIGURE 7;

FIGURE 9 is a sectional view taken along the line 9—9 of FIGURE 7;

FIGURE 10 is a schematic electrical circuit diagram of the embodiment of the answer checking device illustrated in FIGURES 7 through 9; and FIGURE 11 is a sectional view taken along the line 11—11 of FIGURE 9.

Figure 1:
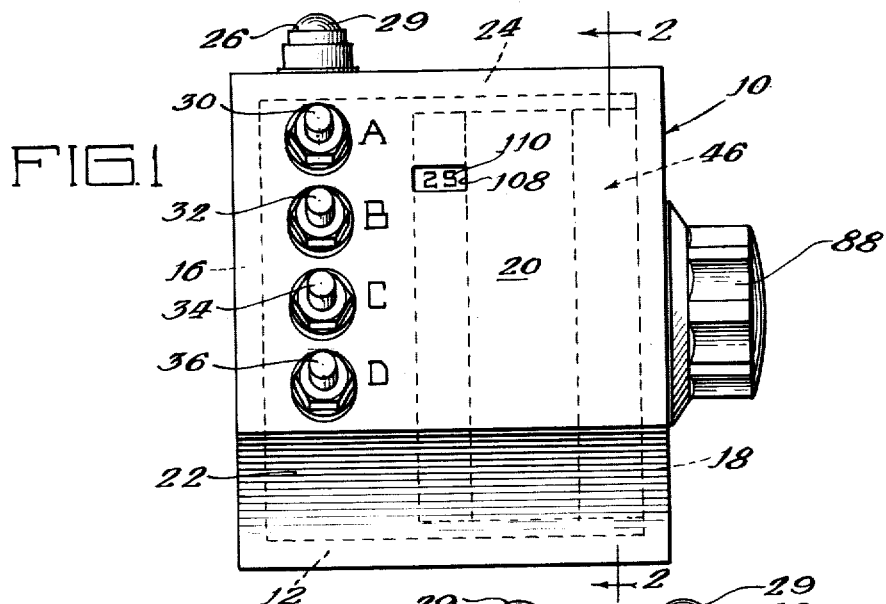
FIGURE 1 is a front elevational view of an answer checking device constructed according to the teachings of the present invention.
Figure 2:
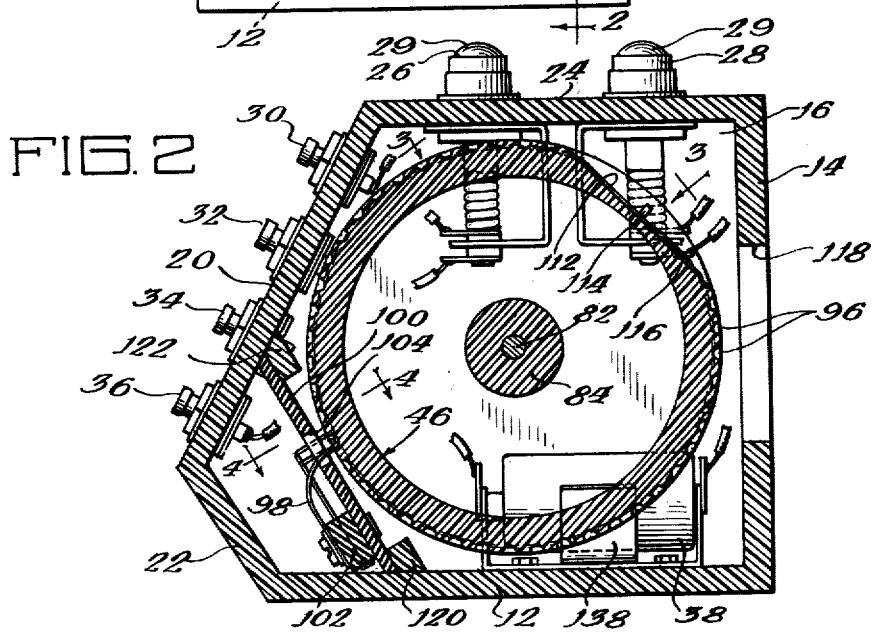
FIGURE 2 is a sectional view of the answer checking device of FIGURE 1 taken along the line 2—2 thereof.
Figure 3:
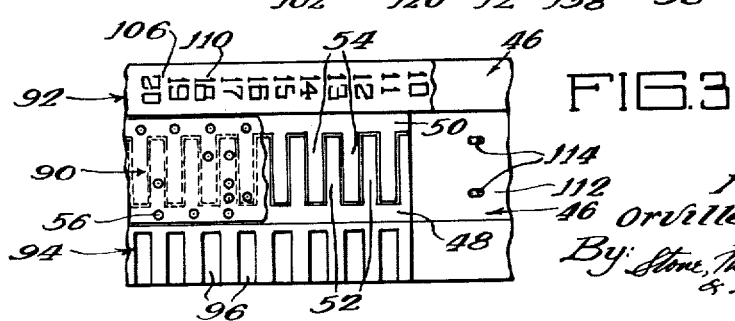
FIGURE 3 is a fragmentary sectional view of the answer checking device illustrated in FIGURES 1 and 2 taken along the line 3—3 of FIGURE 2.

In FIGURES 1 and 2, the illustrated embodiment of the present invention has a housing 10 with a bottom 12, a back wall 14, side walls 16 and 18, a front face 20, a front panel 22, and a top wall 24. The top wall 24 is parallel to the bottom 12, and the side walls 16 and 18 are parallel to each other and normal to the bottom 12. Also, the back wall 14 is normal to the bottom 12 and top 24 and normally interconnects the side walls 16 and 18. The front face 20 is disposed at an acute angle to the top wall 24 and the front panel 22 is disposed at an angle to the bottom 12 and interconnects the front face 20 with the bottom 12.

Two indicator lamps 26 and 28 protrude above the top wall 24 in a line parallel to the side wall 16. One of the indicator lamps 26 is designed to become illuminated as an indication of correct answers and is provided with a green lens 29, and the other indicator lamp 28 becomes illuminated as an indication of erroneous answers and has a read lens 29. A plurality of pushbutton switches are disposed on the front face 20 parallel to and adjacent to the side wall 16. In the embodiment of the invention illustrated in FIGURES 1 through 6, four such switches 30, 32, 34, and 36, are employed, although it is to be noted that more such switches may be utilized in an answer checking device constructed in the manner of the present invention and designed for questions with more than four multiple choice answers.

The present invention may be most readily understood by first examining its electrical circuit which is schematically illustrated in FIGURE 6. The four electrical switches 30, 32, 34 and 36 are all shown in FIGURE 6 in their open position, and this is the normal position of these switches in the absence of activation. The electrical circuit also illustrates the lamp 26 which indicates correct answers and the lamp 28 which indicates incorrect answers. One terminal of each of the lamps 26 and 28 is interconnected and connected to one terminal of a battery 38, and the other terminal of the battery 38 is connected to one terminal of each of the switches 30, 32, 34 and 36.

The terminal of the switch 30 opposite the battery 38 is connected to a pair of parallel electrically conducting brushes or contact fingers 40 and 42 which are in contact at one end thereof with a tape 44 of an electrically insulating material. The contact fingers are spring biased toward the tape 44. The tape 44 is disposed on a drum 46, which is illustrated in FIGURES 2, 3, 4 and 5.

The drum 46 is constructed of electrically insulating material, and has a strip 48 of electrically conducting material disposed adjacent to one side thereof and a second strip 50 of electrically conducting material adjacent to the other side thereof and parallel with the first strip 48. The strip 48 has a plurality of fingers 52 which extend toward the strip 50 at equal intervals, and the strip 50 has a plurality of fingers 54 which extend centrally between the fingers 52. The fingers 52 and 54 are electrically insulated from each other, but the fingers 52 are electrically connected to the first strip 48, while the fingers 54 are electrically connected to the second strip 50.

The tape 44 is provided with a plurality of perforations 56 which are arranged in rows parallel to the axis of elongation of the tape 44. One of these rows of perforations, designated 58, immediately confronts the first strip 48 of electrically conducting material on the surface of the drum 46, while another row 60 of perforations 56 immediately confronts the second strip 50 of electrically conducting material. Each of the perforations 56 in both of the rows 58 and 60 is separated from adjacent perforations by a distance equal to twice the distance between the fingers 40 and 42, and the perforations in the row 60 are located on axes normal to the axis of elongation of the tape 44 which are disposed centrally between the axes normal to the axis of elongation of the tape 44 passing through the perforations 56 of the row 58.

The terminal of the lamp 26 opposite the battery 38 is connected to a pair of electrically conducting spaced parallel contact fingers or brushes 62 and 64 which are aligned with the row of perforations 60, and the contact finger 62 is disposed on the same axis normal to the axis of elongation of the tape 44 as the contact finger 40, while the contact finger 64 is disposed on the same axis normal to the axis of elongation of the tape 44 as the contact finger 42. Also, a contact finger or brush 66 is disposed on the same axis aligned with the row 58 of perforations, and a second contact finger or brush 68 is disposed on the same axis with the fingers 40 and 62 and aligned with the row 58 of perforations. The contact fingers 66 and 68 are also parallel to each other and in abutment with the tape 44, and these contact fingers are connected to the terminal of the lamp 28 opposite the battery 38.

As illustrated in FIGURE 6, a perforation 56 confronts the contact finger or brush 64, hence connecting the lamp 26 to the second electrically conducting strip 50. No perforation 56 confronts the contact finger or brush 62, hence insulating this contact finger from the second strip 50. The contact fingers are all spring biased toward the drum 46, and therefore pass through confronting apertures 56 to make electrical contact with the drum 46. Further, a perforation 56 confronts the contact finger or brush 68 to electrically connect the lamp 28 to the first electrically conducting strip 48, but the contact finger or brush 66 confronts the tape 44 and is insulated from the first electrically conducting strip 48. In this manner, the first electrically conducting strip 48 is electrically connected to the lamp 28, while the second electrically conducting strip 50 is electrically connected to the lamp 26.

A perforation 56 confronts the contact finger 40, but no perforation 56 confronts the contact finger 42. Therefore, the switch 30 is electrically connected to one of the fingers 54 on the drum 46 and connected to the second strip 50, but the switch 30 is not connected to one of the fingers 52 on the drum 46 and is not connected to the first strip 48. Thus, closing the switch 30, closes the electrical circuit through the lamp 26, but not through the lamp 28, therefore indicating a correct answer.

The terminal of the switch 32 opposite the battery 38 is connected to a pair of parallel electrically conducting contact fingers 70 and 72, and the terminal of the switch 34 opposite the battery 38 is connected to a pair of parallel electrically conducting contact fingers 74 and 76. Also, the terminal of the switch 36 opposite the battery 38 is connected to a pair of parallel electrically conducting fingers 78 and 80. The contact fingers 40, 70, 74 and 78 are disposed on a common axis between the contact fingers 62 and 68, and the contact fingers 42, 72, 76 and 80 are disposed upon a common axis between the contact fingers 66 and 64.

The tape 44 is provided with a single perforation 56 for each pair of contact fingers. As indicated above, a single perforation confronts the contact finger 40, while no perforation confronts the contact finger 42, thus indicating a correct answer. Perforations 56 also confront the contact fingers 72, 76 and 80 which confront an electrically conducting finger 52 on the drum 46 and electrically connected to the strip 48. Hence, closing any one of the switches 32, 34 or 36 is effective to close the circuit through the lamp 28 and indicate an erroneous answer. With this description of the electrical circuit, the apparatus may now be more fully described.

The drum 46 is mounted on a shaft 82 by means of a sleeve 84 disposed about the shaft 82 and a disc 86 which is integral with the drum 46 and sleeve 84 and disposed at one end of the sleeve 84 and the drum 46. The shaft 82 is journaled in the wall 18, and terminates in a knob 88 on the exterior of the wall 18. Hence, the rotational position of the drum 46 is changed by rotation of the knob 88.

The exterior surface of the drum 46 has three ring portions extending coaxially thereabout. A central portion 90 of the drum surface contains the electrically conducting strips 48 and 50 and the associated fingers 52 and 54. Two side portions 92 and 94 are disposed on opposite sides of the central portion 90. The side portion 94 has a plurality of equally spaced indentations 96 which extend about the perimeter of the drum 46. These indentations 96 mate with a curved portion of a detent spring 98. The detent spring 98 is mounted at its end opposite the drum 46 on an insulated board 100 by means of a spacer 102, and the spring 98 extends through an opening 104 in the board 100 to engage one of the indentations 96 of the drum 46.

The side portion 92 of the drum 46 has a flat surface provided with a numerical scale 106, and the scale 106 confronts an aperture 108 in the front face 20 of the housing 10. Numbers of the scale 106, designated 110, are visible through the aperture 108 and indicate the position of the drum 46, the drum being held in a plurality of fixed positions by the detent spring 98 and indentations 96 of the drum. It is to be noted that the indentations 96 are equal in number to the number of fingers in one of the two groups of fingers, and as illustrated, the indentations are aligned with the axes of the fingers 54. The numbers 110 are also equal in number with the indentations 96 and aligned therewith. Both of the side portions 92 and 94 are slightly raised above the central portion 90 of the drum 46.

The central portion 90 of the drum has a flat side 112, and a pair of pins 114 extend from the flat side 112. These pins 114 engage a pair of perforations 115 in the tape 44, and secure one end of the tape 44 to the drum. The other end of the tape is secured to the drum by means of adhesive, generally indicated by the layer 116. It is to be noted that the flat side 112 of the drum 46 removes the protruding parts of side portions 92 and 94, and reduces the diameter of this region of portions 92 and 94 to that of the central portion 90. An opening 118 in the back wall 14 permits the end of the tape carrying the perforations 115 for the pins 114 to be inserted into the housing 10 and to engage the pins 114. Thereafter, the drum 46 is rotated by means of the knob 88 to position the entire tape on the central portion 90 of the drum 46 and to secure the end opposite the pins 115 to the drum by means of the adhesive layer 116.

FIGURES 4 and 5 illustrate in detail the electrically conducting contact fingers or brushes which make contact with the tape 44 or drum 46. These fingers are mounted on the board 100, and the board 100 extends between the bottom 12 and front face 20 of the housing 10, mounting flanges 120 and 122 being used to support the board 100 to these surfaces, respectively. The board 100 is provided with two parallel rows of bores 124, one row 126 being disposed above the other row 128. The upper row of bores 124 accommodates the electrically conducting contact fingers 62, 78, 74, 70, 40 and 68, while the lower row of bores 124 accommodates the contact fingers associated with each of these fingers. The bores 124 maintain the contact fingers in slidable parallel spaced alignment. Each of the fingers is electrically connected to an elongated spring 130 which is electrically conducting. The springs 130 electrically interconnect the contact fingers in each pair. Thus, contact fingers 78 and 80 are electrically connected together at the ends of the springs 130 opposite the contact fingers, and these springs 130 are mounted between electrically insulating strips 132 and 134. The strips 132 and 134 are mounted on the board 100. The electrically conducting springs 130 extend from the side of the strips 132 and 134 opposite the contact fingers, thereby forming electrical terminals 136. The terminals 136 are connected in the electrical circuit illustrated in FIGURE 6 and described above.

The battery 38 is mounted on the bottom 12 of the housing 10 by means of a bracket 138. The indicator lamps 26 and 28 are provided with colored lenses 29 in order to aid to distinguish which of the two lamps is illuminated. Also, the front face 20 of the housing 10 carries numerical or alphabetical designations for each of the switches 30, 32, 34 and 36.

The answer checking device is used in conjunction with an instruction book or manual which has a plurality of questions to be answered. The particular device here disclosed is designed for use with multiple choice questions where not more than four possible answers exist. If the student desires to answer question 25 in the instruction book, he sets the knob 88 to position the numerical scale 106 to indicate the number 25 in the aperture 108. The drum 46 then automatically locks in a definite position by action of the detent spring 98. As a result, a particular set of perforations 56 are aligned with the contact fingers confronting the tape 44 and drum 46. If the perforations 56 are aligned in the manner illustrated in FIGURE 6, then only switch 30 will indicate a correct answer and light the lamp 26, and the other switches 32, 34 and 36 will illuminate the lamp 28 indicating an erroneous answer. The tape 44 may obviously be arranged for more than one correct answer, or may be arranged for no correct answer.

FIGURES 7 through 10 illustrate a second embodiment of the present invention. In this embodiment, the identical tape illustrated in FIGURES 1 through 6 is employed, however, a different method of selecting the correct answer and a different electrical circuit is utilized.

As illustrated in FIGURE 7, the tape 44 is mounted on a flat board 140 which serves an analogous function to the drum 46, and the board 140 may be substituted for the drum in the embodiment of FIGURES 1 through 6 or the drum may be substituted for the board 140 in the embodiment of FIGURES 7 through 10. This board 140 is translatably mounted in a slot 142 of a housing 10A. The board 140 is provided with clips 144 and 146 at opposite ends thereof for securing the tape 44 to the board. The board 140 is constructed of electrically conducting material, such as brass or aluminum, or may be constructed of electrically insulating material, such as polyethylene, and provided with an electrically conducting layer 148 on its surface confronting the tape 44.

The housing 10A has a pair of parallel side walls 150 and 152 which accommodate the slots 142 for the board 140. A face wall 154 and rear wall 156 interconnect the side walls 150 and 152, and a top wall 158 extends between the side walls 150 and 152. The face wall 154 is connected to the top wall 158 by a diagonal face wall 160, and the rear wall 156 is connected to the top wall 158 by a diagonal rear wall 162.

The diagonal face wall 160 has a rectangular opening 164 therein which accommodates a rectangular cross sectioned slide 166. The slide 166 has a pair of electrically conducting fingers 168 and 170 mounted thereon adjacent to the end thereof disposed with the housing 10A. These fingers are mounted in a plane which is parallel to the axis of elongation of the tape 44, and the fingers may be moved parallel to this axis by translation of the slide 166 relative to the housing 10A. The fingers 168 and 170 are similar in construction to the fingers disclosed in the embodiment of FIGURES 1 through 6, except, the fingers 168 and 170 are not electrically interconnected.

The slide 166 is disposed between a push button 172 mounted in an opening 174 in the top wall 158 of the housing 10A, and biased in position by a spring 175. When the push button 172 is depressed, the fingers 168 and 170 are forced into engagement with the tape 44 and board 140.

FIGURE 10 illustrates the electrical circuit employed for the answer checking device of FIGURES 7 through 11. A battery 176 has one terminal electrically connected to the electrically conducting layer 148 of the board 140. The other terminal of the battery 176 is connected to a pair of lamps 178 and 180. The lamp 178 is electrically connected to the electrically conducting finger 170, and the lamp 180 is electrically connected to the electrically conducting finger 168.

Referring to FIGURE 6 of the drawings, it will be seen that the tape 44 has perforations which are aligned along three groups of axes. The first group of axes are those parallel to the axis of elongation of the tape. For each position of the board 140, the perforations along a given axis of the first group represent one of a plurality of possible answers to a given question. The slide 166 is thus positioned so that the fingers 168 and 170 align with one of the axes of this first group for the purpose of indicating a correct or erroneous answer to the question established by the position of the board 140 relative to the slide 166.

The perforations of the tape 44 are also aligned with a second group of axes which are normal to the axis of elongation of the tape and are equally spaced in parallel relationship. For each position of the board 140, one of these axes of the second group is aligned with the electrically conducting finger 168 which may probe the existence of a perforation at the intersection of each of the axes of the first group and that axis of the second group positioned in alignment therewith. The perforations of the tape 44 are also disposed on a third group of axes which are parallel to the axes of the second group and each axis of the third group is located between a pair of axes of the second group. Each axis of the third group is spaced from the adjacent axis of the second group by the distance between the electrically conducting fingers 168 and 170, so that for each position of the slide 166, there is a simultaneous probing for the existence of a perforation aligned with one of the axes of the first group and a particular axis of the second group and a particular axis of the third group.

It is to be recognized that the slide 166 must be inserted into the housing 10A to align the fingers 168 and 170 with an axis of the first group on the tape 44, and this is accomplished by designations on the top of the slide 166, as illustrated in FIGURE 7. In the particular embodiment, the answer is given in multiple choice form by the letters A, B, C, or D, and the slide is positioned to indicate the line separating areas so designated on the upper surface thereof. Thereafter, the push button 172 is depressed to force the fingers 168 and 170 into contact with the tape 44. If either finger locates a perforation in the tape 44, the lamp 178 or 180 connected to that finger will illuminate.

The board 140 must also be properly positioned relative to the housing 10A to designate the proper question. As indicated on the board in FIGURE 7, this is accomplished by numbers printed on the tape, but it can also be accomplished by a detent mechanism such as used in the embodiment of FIGURES 1 through 6.

As illustrated in FIGURE 8, the lamps 178 and 180 are mounted within the housing 10A and focused on a common lens 182. The lamp 178 is provided with a lens 184 which has a red color, while the lamp 180 is provided with a lens 186 which has a green color. Since the lens 182 is clear, the color of the illuminated lamp shows through to indicate a right or a wrong answer.

From the foregoing disclosure, those skilled in the art will readily devise many modified constructions which are within the scope of the present invention. For example, rather than actuating a lamp, a bell could be coupled to the electrical circuit, or a counting device used to replace the lamps of the electrical circuit in order to tabulate each answer of the student. It is therefore intended that the scope of the present invention be not limited by the foregoing disclosure, but rather only by the appended claims.

The invention claimed is:

1. An answer checking device comprising a drum of electrically insulating material, a first and a second strip of electrically conducting material disposed about the drum parallel to each other and coaxially of the drum, a first group of fingers of electrically conducting material extending normally from the first strip toward the second strip, said fingers being spaced from each other by equal increments, a second group of fingers of electrically conducting material extending from the second strip toward the first strip, each finger of the second group being disposed between two adjacent fingers of the first group, the fingers of the first group being electrically connected to the first strip and electrically insulated from the second strip and the fingers of the second group being electrically connected to the second strip and electrically insulated from the first strip, a first electrically conducting brush disposed in slidable engagement with the first strip, a source of electromotive force having first and second terminals, a first electrically responsive indicator electrically connected between the first brush and the first terminal of the source, a second brush of electrically conducting material in slidable engagement with the second strip, a second electrically responsive indicator electrically connected between the second brush and the first terminal of the source, a switch having a first terminal electrically connected to the second terminal of the source and a second terminal, a pair of elongated contact fingers abutting the drum between the two strips thereon at points on an axis normal to the fingers on the drum and spaced by approximately one-half the increment between the fingers of the first group, said fingers being electrically connected to the second terminal of the switch, and a tape of electrically insulating material mounted on the drum between the contact fingers and the first and second group of fingers on the drum, said tape having a perforation confronting only one of the contact fingers, whereby closing the switch completes an electrical circuit through only one of the indicators.

2. An answer checking device comprising a support member, a drum of electrically insulating material rotatably mounted on the support member, a first and a second strip of electrically conducting material disposed about the drum parallel to each other and coaxially of the drum, a first group of fingers of electrically conducting material extending normally from the first strip toward the second strip, said fingers being spaced from each other by equal increments, a second group of fingers of electrically conducting material extending from the second strip toward the first strip, each finger of the second group being disposed between two adjacent fingers of the first group, the fingers of the first group being electrically connected to the first strip and electrically insulated from the second strip and the fingers of the second group being electrically connected to the second strip and electrically insulated from the first strip, detent means for stopping rotation of the drum relative to the support member at surface increments equal to the increments between fingers of the first group of fingers on the drum, a first electrically conducting brush mounted on the support member disposed in slidable engagement with the first strip, a source of electromotive force having first and second terminals, a first electrically responsive indicator electrically connected between the first brush and the first terminal of the source, a second brush of electrically conducting material in slidable engagement with the second strip, a second electrically responsive indicator electrically connected between the second brush and the first terminal of the source, a switch having a first terminal electrically connected to the second terminal of the source and a second terminal, a pair of elongated contact fingers mounted on the support member abutting the drum between the two strips thereon at points on an axis normal to the fingers on the drum and spaced by approximately one-half the increment between the fingers of the first group, said fingers being electrically connected to the second terminal of the switch, and a tape of electrically insulating material mounted on the drum between the contact fingers and the first and second group of fingers on the drum, said tape having a perforation for each stopped position of the drum confronting only one of the contact fingers, whereby, for each stopped position of the drum, closing the switch completes an electrical circuit through only one of the indicators.

3. An answer checking device comprising a housing having a bottom, a side wall and a face wall, the face wall being provided with a window therein, a drum of electrically insulating material rotatably mounted on and within the housing on an axis parallel with the face wall, said drum having a plurality of spaced numbers disposed about the perimeter thereof at equal intervals and confronting the window in the housing, a first and a second strip of electrically conducting material disposed about the drum parallel to each other and coaxially of the drum, a first group of fingers of electrically conducting material extending normally from the first strip toward the second strip, said fingers being spaced from each other by increments equal to the spacing between numbers on the drum, a second group of fingers of electrically conducting material extending from the second strip toward the first strip, each finger of the second group being disposed between two adjacent fingers of the first group, the fingers of the first group being electrically connected to the first strip and electrically insulated from the second strip and the fingers of the second group being electrically connected to the second strip and electrically insulated from the first strip, detent means for stopping rotation of the drum relative to the housing at surface increments equal to the distance between numbers on the drum, a first electrically conducting brush, a source of electromotive force having first and second terminals, a first electrically responsive indicator electrically connected between the first brush and the first terminal of the source, a second brush of electrically conducting material, a second electrically responsive indicator electrically connected between the second brush and the first terminal of the source, a switch having a first terminal electrically connected to the second terminal of the source and a second terminal, and a pair of elongated contact fingers, means for mounting the first and second brush and the pair of contact fingers on the housing in abutment with the drum on an axis parallel to the axis of the drum, said means positioned the first brush in slidable engagement with the first strip, the second brush in slidable engagement with the second strip, and in stopped positions of the drum, one of the contact fingers of the pair of contact fingers in slidable engagement with a finger of the first group of fingers on the drum and the other contact finger of the pair in slidable engagement with a finger of the second group on the drum, said contact fingers being electrically connected to the second terminal of the switch, and a tape of electrically insulating material mounted on the drum between the contact fingers and the first and second group of fingers on the drum, said tape having a perforation for each stopped position of the drum confronting only one of the contact fingers, whereby for each stopped position of the drum closing the switch completes an electrical circuit through only one of the indicators.

4. An answer checking device comprising the elements of claim 3 in combination with a second pair of contact fingers, the mounting means mounting said second pair of contact fingers on the housing on the same axis as the first pair of contact fingers in slidable contact with the fingers on the drum, and a second switch electrically connected between said second pair of contact fingers and the second terminal of the source.

5. An answer checking device comprising the elements of claim 3 wherein the tape comprises an elongated strip provided with at least one perforation on each of a plurality of axes normal to the axes of elongation of the tape and spaced at intervals equal to one half the distance between fingers of the fingers of the first group on the drum, said perforations being disposed in three rows parallel to the axes of elongation of the tape, one of said rows having perforations on every other axes and confronting the first strip on the drum, and a second row having perforations on the axes between the perforations of the first row confronting the second strip on the drum, and the third row having perforations aligned with the pair of contact fingers.

6. An answer checking device comprising the elements of claim 3 wherein the detent means comprises a plurality of equally spaced indentations disposed in a plane normal to the axis of the drum at equal intervals about the periphery of the drum, and a spring mounted on the housing at one end and engaging one of the indentations at the other end thereof.

7. An answer checking device comprising the elements of claim 3 in combination with a shaft mounted on the drum and extending to the exterior of the housing, and a knob mounted on the shaft for rotation of the drum.

8. An answer checking device comprising an elongated tape of electrically insulating material having perforations disposed on at least two axes of a first group of spaced axes parallel to the axis of elongation of the tape, the perforations also being disposed on a second and a third group of axes normal to the axis of elongation of the tape, the axes of the second group being spaced at equal intervals and the axes of the third group also being spaced at equal intervals and each axis of the third group being disposed between two axes of the second group, a housing, means mounted on the housing for translating the tape along its axis of elongation including at least one member having an electrically conducting surface in abutment with the tape, means mounted on the housing carrying a pair of spaced electrically conducting fingers disposed in abutment with the tape on one of the axes of the first group, said conducting fingers being spaced from each other by the distance between an axis of the second group and the adjacent axis of the third group, and electrical circuit means for indicating contact between one of the fingers and the electrically conducting member.

9. An answer checking device comprising the elements of claim 8 wherein two electrically conducting members abut the tape, one member having a portion confronting each of the axes of the second group and the other member having a portion confronting each of the axes of the third group.

10. An answer checking device comprising the elements of claim 9 wherein the electrical circuit means comprises a power source, a first electrical indicator connected between one electrically conducting member and one terminal of the power source, a second electrical indicator connected between the other electrically conducting member and the one terminal of the power source, and means electrically connecting the other terminal of the power source with both of the electrically conducting fingers.

11. An answer checking device comprising the elements of claim 8 wherein one electrically conducting member abuts the tape and the means for mounting the electrically conducting fingers includes means for selecting alignment of the fingers with any one of a plurality of axes of the first group.

12. An answer checking device comprising the elements of claim 11 wherein the electrical circuit means comprises a direct current power source having one terminal electrically connected to the electrically conducting member, a first and a second electrically responsive indicator having a first terminal connected to the other terminal of the power source, the first of said indicators having a second terminal electrically connected to one of the fingers, and the second indicator having a second terminal electrically connected to the other of the fingers.

13. An answer checking device comprising an elongated tape of electrically insulating material having perforations disposed on at least two axes of a first group of spaced axes parallel to the axis of elongation of the tape, the perforations also being disposed on a second and a third group of axes normal to the axis of elongation of the tape, the axes of the second group being spaced at equal intervals and the axes of the third group also being spaced at equal intervals and each axis of the third group being disposed between two axes of the second group, a housing having a channel extending therethrough, a board translatably disposed within the channel of the housing, the tape being mounted on one surface of the board with its axis of elongation aligned with the axis of translation of the board, said board having means defining an electrically conducting surface located in abutment with the tape, said housing being provided with an openng therein located on the side of the tape opposite the board, a bar slidably disposed in the opening extending through the housing, a pair of fingers mounted on the bar within the housing and terminating on an axis disposed parallel to the axis of elongation of the tape, means for biasing the fingers in abutment with the tape, a power source having one terminal electrically connected to the electrically conducting surface of the board, a first indicator having one terminal electrically connected to the other terminal of the power source and a second terminal electrically connected to one of the fingers, and a second indicator having one terminal electrically connected to the other terminal of the power source and a second terminal electrically connected to the other finger.

14. An answer checking device comprising the elements of claim 13 wherein the housing is provided with an aperture confronting the bar, and the means for biasing the fingers into abutment with the tape comprises a push button translatably mounted in the aperture of the housing and confronting the bar, whereby depressing the push button urges the fingers toward the tape.

15. An answer checking device comprising the elements of claim 13 wherein the board is disposed in a flat plane, and the bar has an axis of elongation normal to the axis of elongation of the tape.

References Cited in the file of this patent

UNITED STATES PATENTS

| | | |
|---|---|---|
| Re. 20,463 | Sveda et al. | Aug. 3, 1937 |
| 2,062,453 | Hastings | Dec. 1, 1936 |
| 2,663,091 | Brown | Dec. 22, 1953 |
| 2,720,038 | Clark | Oct. 11, 1955 |
| 2,826,828 | Hamilton | Mar. 18, 1958 |
| 2,911,741 | Boyer | Nov. 10, 1959 |

UNITED STATES PATENT OFFICE

CERTIFICATE OF CORRECTION

Patent No. 3,089,255                          May 14, 1963

Orville I. Thompson

It is hereby certified that error appears in the above numbered patent requiring correction and that the said Letters Patent should read as corrected below.

Column 2, line 56, for "read" read -- red --; column 9, line 19, for "positioned" read -- positioning --; column 10, line 66, for "openng" read -- opening --.

Signed and sealed this 9th day of June 1964.

(SEAL)
Attest:

ERNEST W. SWIDER
Attesting Officer

EDWARD J. BRENNER
Commissioner of Patents